(12) United States Patent
Wang et al.

(10) Patent No.: US 11,607,974 B2
(45) Date of Patent: Mar. 21, 2023

(54) POWER SLIDE WITH MOTOR DIRECTLY CONNECTED TO LEAD SCREW

(71) Applicant: KEIPER SEATING MECHANISMS CO., LTD., Shanghai (CN)

(72) Inventors: Chuan Wang, Shanghai (CN); Hongbin Ni, Shanghai (CN); Zhenyi Tang, Shanghai (CN); Hongyu Wang, Shanghai (CN); Xiaoming Zhang, Shanghai (CN)

(73) Assignee: KEIPER SEATING MECHANISMS CO., LTD., Shanghai (CN)

( * ) Notice: Subject to any disclaimer, the term of this patent is extended or adjusted under 35 U.S.C. 154(b) by 163 days.

(21) Appl. No.: 17/271,607

(22) PCT Filed: Aug. 19, 2019

(86) PCT No.: PCT/CN2019/101332
§ 371 (c)(1),
(2) Date: Feb. 26, 2021

(87) PCT Pub. No.: WO2020/042947
PCT Pub. Date: Mar. 5, 2020

(65) Prior Publication Data
US 2021/0339655 A1     Nov. 4, 2021

(30) Foreign Application Priority Data
Aug. 28, 2018  (CN) .......................... 201810986307.1

(51) Int. Cl.
*B60N 2/08*    (2006.01)
*B60N 2/06*    (2006.01)
(Continued)

(52) U.S. Cl.
CPC ........... *B60N 2/067* (2013.01); *B60N 2/0232* (2013.01); *B60N 2/0722* (2013.01); *B60N 2002/024* (2013.01)

(58) Field of Classification Search
CPC .. B60N 2/0887; B60N 2/0705; B60N 2/0806; B60N 2/0715; B60N 2/0725;
(Continued)

(56) References Cited

U.S. PATENT DOCUMENTS 6,915,998 B2 *  7/2005  Borbe ................... B60N 2/067
                                                     296/65.15
8,523,263 B2 *  9/2013  Kimura ................. B60N 2/067
                                                     296/65.13
(Continued)

FOREIGN PATENT DOCUMENTS

CN     103085683     5/2013
CN     103818273     5/2014
(Continued)

OTHER PUBLICATIONS

"International Search Report (Form PCT/ISA/210) of PCT/CN2019/101332", dated Nov. 14, 2019, with English translation thereof, pp. 1-4.

*Primary Examiner* — Nkeisha Smith
(74) *Attorney, Agent, or Firm* — JCIP Global Inc.

(57) ABSTRACT

A novel power slide with a motor directly connected to a lead screw includes a left slide and a right slide each including a top rail, a bottom rail, a power motor, a lead screw, a threaded assembly and a retainer ring. A first slot and a second slot are formed in two ends of the top rail, respectively. The power motor is fixed to a lower surface of the top rail through a motor bracket. The lead screw has an end connected to the power motor and another end rotatably fixed to the lower surface of the top rail. A bottom portion of the threaded assembly is fixedly connected to an upper (Continued)

surface of the bottom rail, and the lead screw horizontally penetrates through the threaded assembly and is in threaded fit with the threaded assembly. The retainer ring is located in the first slot, and a gap is formed between the retainer ring and the first slot.

7 Claims, 4 Drawing Sheets

(51) Int. Cl.
*B60N 2/02* (2006.01)
*B60N 2/07* (2006.01)

(58) Field of Classification Search
CPC . B60N 2/073; B60N 2/07; B60N 2/06; B60N 2/08; B60N 2/0812; B60N 2/0818; B60N 2/0831; B60N 2/0837; B60N 2/0843; B60N 2/085; B60N 2/0875; B60N 2/0862
See application file for complete search history.

(56) References Cited

U.S. PATENT DOCUMENTS

| | | | | |
|---|---|---|---|---|
| 8,820,694 | B2 * | 9/2014 | Tarusawa | B60N 2/067 |
| | | | | 296/65.13 |
| 9,511,685 | B2 * | 12/2016 | Enokijima | B60N 2/067 |
| 10,046,672 | B2 * | 8/2018 | Kuroda | B60N 2/0715 |
| 10,220,730 | B2 * | 3/2019 | Nagata | B60N 2/0705 |
| 10,486,554 | B2 * | 11/2019 | Napau | B60N 2/06 |
| 11,273,506 | B2 * | 3/2022 | Napau | B23F 11/00 |
| 11,299,070 | B2 * | 4/2022 | Kimata | B60N 2/0727 |
| 11,400,835 | B2 * | 8/2022 | Wang | B60N 2/0722 |
| 2009/0243326 | A1 * | 10/2009 | Kimata | B60N 2/0715 |
| | | | | 296/65.15 |
| 2011/0079699 | A1 * | 4/2011 | Tarusawa | B60N 2/067 |
| | | | | 248/429 |
| 2019/0381915 | A1 * | 12/2019 | Taniguchi | B60N 2/0705 |
| 2021/0394646 | A1 * | 12/2021 | Meguro | B60N 2/0732 |

FOREIGN PATENT DOCUMENTS

| | | |
|---|---|---|
| CN | 109080508 | 12/2018 |
| JP | 2017132319 | 8/2017 |

\* cited by examiner

POWER SLIDE WITH MOTOR DIRECTLY CONNECTED TO LEAD SCREW

CROSS-REFERENCE TO RELATED APPLICATION

This application is a 371 of international application of PCT application serial no. PCT/CN2019/101332, filed on Aug. 19, 2019, which claims the priority benefit of China application no. 201810986307.1, filed on Aug. 28, 2018. The entirety of each of the above mentioned patent applications is hereby incorporated by reference herein and made a part of this specification.

BACKGROUND

Technical Field

The invention relates to the technical field of vehicle seat slides, in particular to a power slide with a motor directly connected to a lead screw.

Description of Related Art

As shown in FIG. 1 and FIG. 2, there are two types of power slides on the present market, namely front power slides and middle power slides.

Both the front power slides and the middle power slides are composed of a motor (1a), a motor bracket (2a), a flexible shaft assembly (3a), a left slide (4a) and a right slide (5a). The existing power slides have the following defects. Neither the front power slides nor the middle power slides can meet requirements in future more complicated power car body environments (due to the interference between the motor bracket and the car body or car components). The length of the motor bracket (2a) has to be designed to match different car bodies, and the modular capacity and the universality are poor. The motor bracket (2a) may be touched by passengers or drivers, so that the stability is poor. The motor (1a) transmits power to a lead screw by means of the flexible shaft assembly (3a) and a gearbox based on multi-stage transmission, so the number of parts is large, the sound quality and stability are poor, and the energy transmission efficiency is low.

SUMMARY

The main objective of the invention is to solve the technical problems of the prior art by providing a power slide with a motor directly connected to a lead screw, which can adapt to more complicated power car environments and has good universality and stability.

The technical solution adopted by the invention to solve the aforesaid technical problems is as follows.

The invention provides a power slide, including a left slide and a right slide. The left slide and the right slide each comprise a top rail and a bottom rail, a power motor, a lead screw, a threaded assembly and a retainer ring. The top rail is arranged above the bottom rail and is slidably connected to the bottom rail, and a first slot and a second slot are formed in two ends of the top rail, respectively. The power motor is fixed to a lower surface of the top rail through a motor bracket. The lead screw is arranged above the bottom rail in parallel and has one end connected to the power motor and the other end rotatably fixed to the lower surface of the top rail. A bottom portion of the threaded assembly is fixedly connected to an upper surface of the bottom rail, and the lead screw horizontally penetrates through the threaded assembly and is in threaded fit with the threaded assembly. The retainer ring is fixed to the end, close to the power motor, of the lead screw and is located in the first slot. A gap is formed between the retainer ring and the first slot.

Furthermore, a rubber part is arranged between the power motor and the motor bracket and is disposed around an outer surface of the power motor.

Furthermore, the motor bracket is fixedly connected to the lower surface of the top rail through a first bolt.

Furthermore, the power slide further includes a rear bracket fixed in the second slot, a central hole is formed in the rear bracket, and an integrally-formed unthreaded shaft is arranged at the other end of the lead screw and is matched with the central hole.

Furthermore, the threaded assembly is fixedly connected to the bottom rail through a second bolt.

Furthermore, the lead screw and a rotor shaft of the power motor are integrally formed.

The invention has the following beneficial effects. When the position of the power slide needs to be adjusted, the power motor drives the lead screw to rotate through the coupling, the lead screw is matched with the middle threaded assembly to convert the rotational motion of the lead screw into the linear motion of the bottom rail, and the power motor is connected to the top rail through the motor bracket and is fixed with respect to the top rail, so that the rotational motion of the lead screw is converted into the relative linear motion between the top rail and the bottom rail, and thus, an adjustment of the relative positions of the top rail and the bottom rail is realized. Parts such as a flexible shaft are omitted, and the number of parts is reduced, so the power slide can adapt to more complicated power car environments and has increased universality and stability.

BRIEF DESCRIPTION OF THE DRAWINGS

To more clearly explain the technical solutions of the embodiments of the invention or the prior art, drawings used for describing the embodiments of the invention or the prior art will be briefly introduced below. Obviously, the drawings in the following description are merely for illustrating some embodiments of the invention, and those ordinarily skilled in the art can obtain other drawings according to the following ones without creative labor.

DESCRIPTION OF THE EMBODIMENTS

Figure 1:
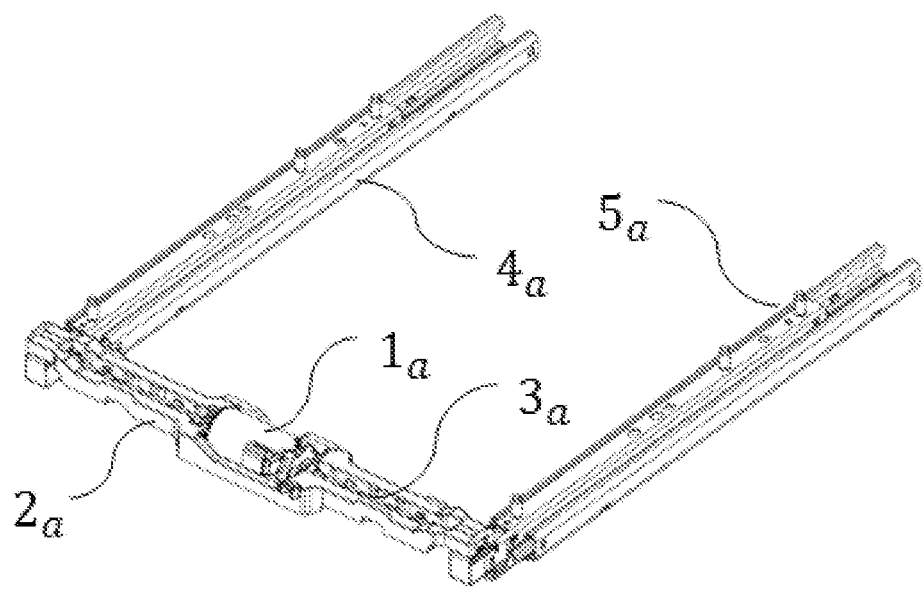
FIG. 1 is a structural diagram of a front power slide in the prior art.
Figure 2:
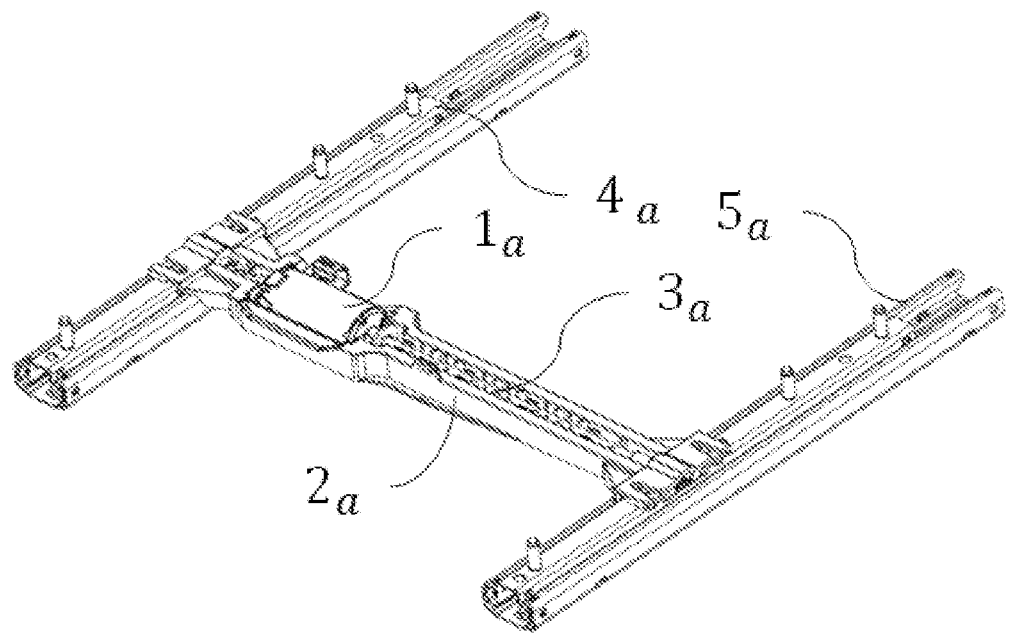
FIG. 2 is a structural diagram of a middle power slide in the prior art.
Figure 3:
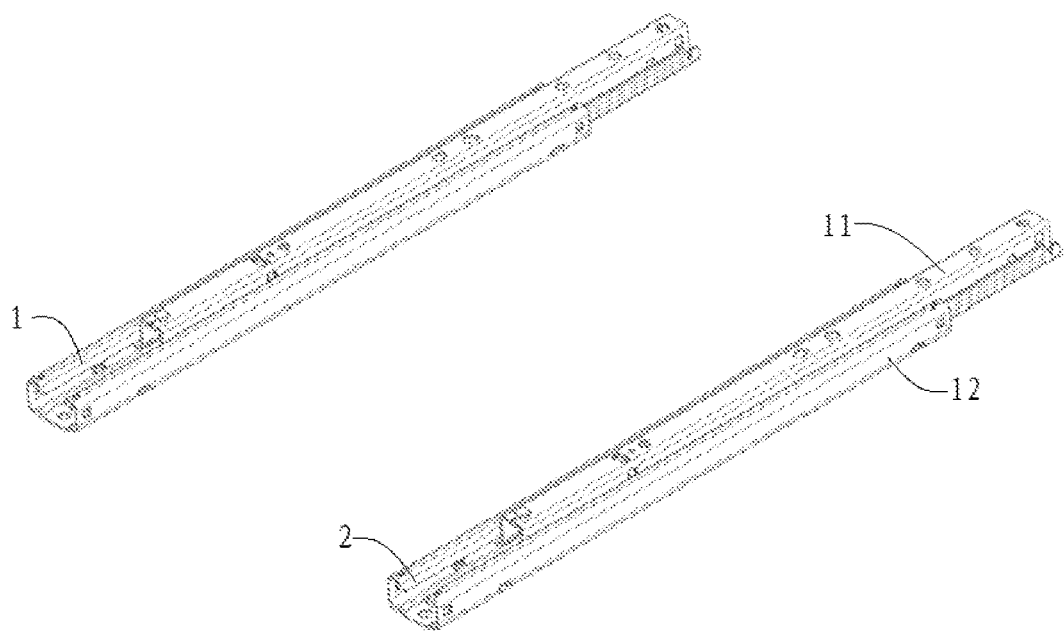
FIG. 3 is a structural diagram of a power slide with a motor directly connected to a lead screw according to the invention.
Figure 4:
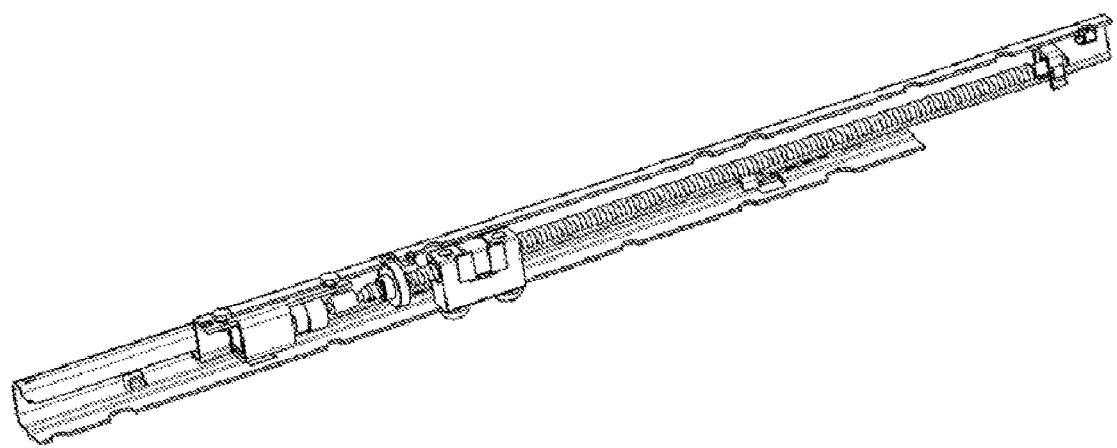
FIG. 4 is a sectional view of the power slide with a motor directly connected to a lead screw according to the invention.
Figure 5:
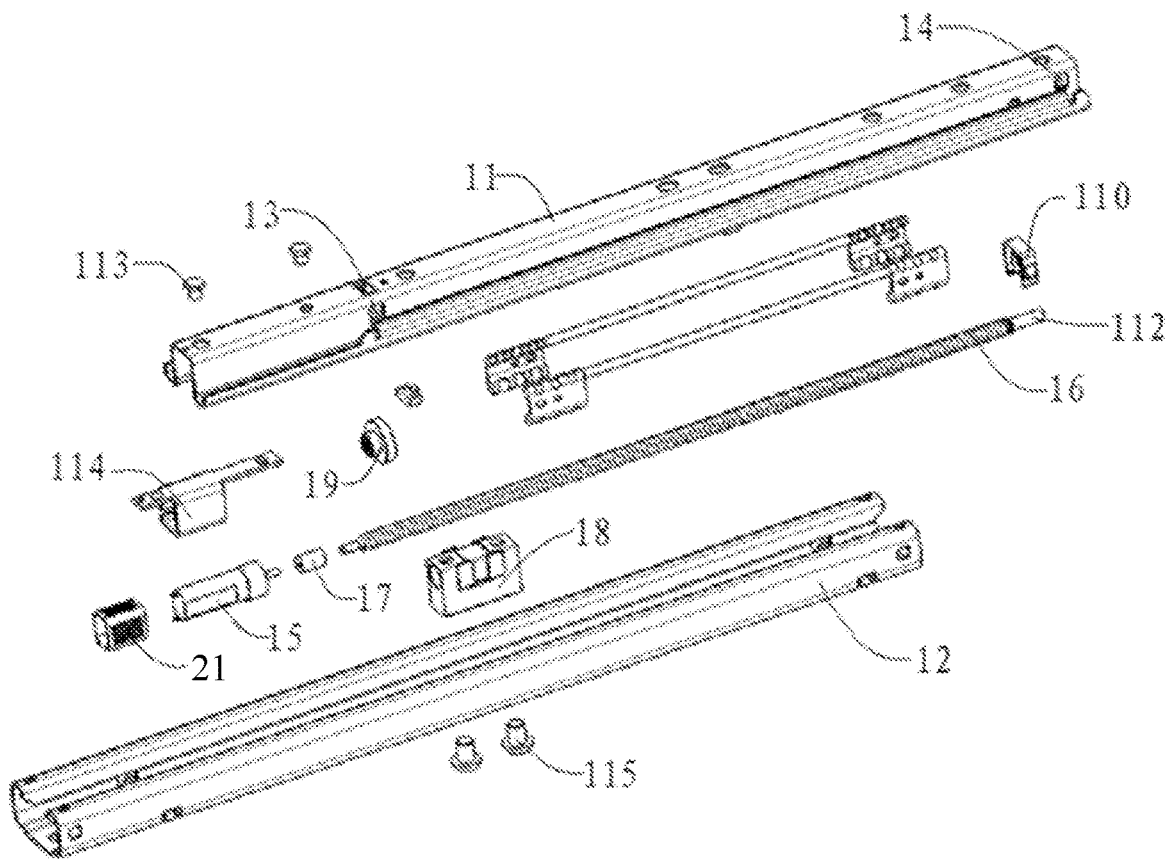
FIG. 5 is an exploded view of the power slide with a motor directly connected to a lead screw according to the invention.
Figure 6:
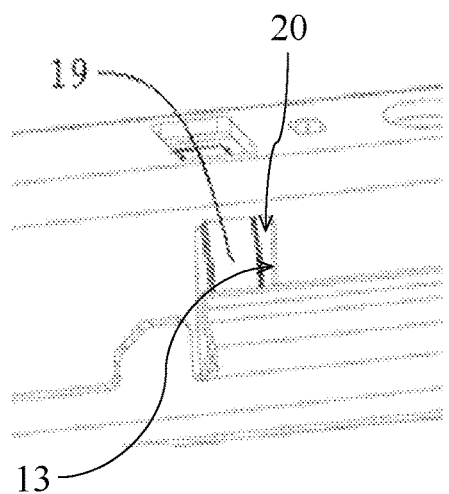
FIG. 6 is a structural diagram of a first slot of the power slide with a motor directly connected to a lead screw according to the invention.
Figure 7:
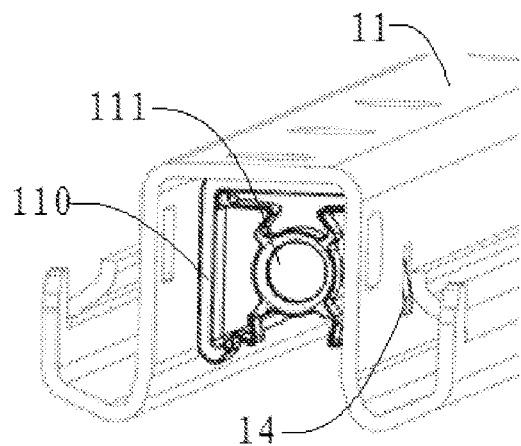
FIG. 7 is a structural diagram of a second slot of the power slide with a motor directly connected to a lead screw according to the invention.

Referring to FIG. 3 to FIG. 7, the invention provides a power slide with a motor directly connected to a lead screw. The power slide includes a left slide 1 and a right slide 2. The left slide 1 and the right slide 2 each comprise a top rail 11, a bottom rail, a power motor 15, a lead screw 16, a threaded assembly 18 and a retainer ring 19.

Referring to FIG. 3 to FIG. 7, the invention provides a novel power slide with a motor directly connected to a lead screw. The power slide includes a left slide 1 and a right slide 2. The left slide 1 and the right slide 2 each comprise:

The top rail 11 is arranged above the bottom rail 12 and is slidably connected to the bottom rail 12, and a first slot 13 and a second slot 14 are formed at two ends of the top rail 11, respectively.

The power motor 15 is fixed to a lower surface of the top rail 11 through a motor bracket 114.

The lead screw 16 is arranged above the bottom rail 12 in parallel. One end of the lead screw 16 is connected to the power motor 15, and the other end of the lead screw 16 is rotatably fixed to the lower surface of the top rail 11. Or, one end of the lead screw 16 is connected to the power motor 15 through a coupling 17.

A bottom portion of the threaded assembly 18 is fixedly connected to the upper surface of the bottom rail 12, and the lead screw 16 horizontally penetrates through the threaded assembly 18 and is in threaded fit with the threaded assembly 18.

The retainer ring 19 is fixed to the end, close to the power motor 15, of the lead screw 16. The retainer ring 19 is located in the first slot 13, and a gap 20 is formed between the retainer ring 19 and the first slot 13. According to the invention, when the front side or the rear side of a vehicle is collided, the retainer ring 19 and the first slot 13 contact with each other after the gap 20 therebetween is eliminated, so as to fix the lead screw 16, so that the position of the slide will not be changed, and the safety of personnel is guaranteed.

According to the invention, when the position of the power slide needs to be adjusted, the power motor 15 drives the lead screw 16 to rotate through the coupling 17, the lead screw 16 is matched with the middle threaded assembly 18 to convert the rotational motion of the lead screw 16 into the linear motion of the bottom rail 12, and the power motor 15 is connected to the top rail 11 through the motor bracket 114 and is fixed with respect to the top rail 11, so that the rotational motion of the lead screw 16 is converted into the relative linear motion between the top rail 11 and the bottom rail 12, and thus, an adjustment of the relative positions of the top rail 11 and the bottom rail 12 is realized. Parts such as a flexible shaft are omitted, and the number of parts is reduced, so the power slide can adapt to more complicated power car environments and has increased universality and stability.

Preferably, a rubber part 21 is arranged between the power motor 15 and the motor bracket 114 and is disposed around an outer surface of the power motor 15. The rubber part 21 can effectively prevent the resonance between the power motor 15 and the top rail 11, thus lowering noises.

Preferably, the motor bracket 114 is connected and fixed to the lower surface of the top rail 11 through first bolts 113.

The power slide of the invention further comprises a rear bracket 110 fixed in the second slot 14. A central hole 111 is formed in the rear bracket 110, and an integrally-formed unthreaded shaft 112 is arranged at the other end of the lead screw 16 and is matched with the central hole 111. The unthreaded shaft 112 and the central hole 111 are mainly used to support the lead screw 16 to rotate.

Preferably, the threaded assembly 18 is fixedly connected to the bottom rail 12 through second bolts 115.

According to the invention, when subject to a front or back longitudinal force (parallel to the top rail), the top rail 11 transmits the force to the power motor 15 through the motor bracket 114, the power motor 15 transmits the force to the lead screw 16 through the coupling 17, and the longitudinal force will cause longitudinal displacement of the bottom rail 12 because of the self-locking performance realized by threaded connection of the lead screw 16 and the threaded assembly 18, so that the top rail 11 and the bottom rail 12 are locked relatively.

Figure 8:
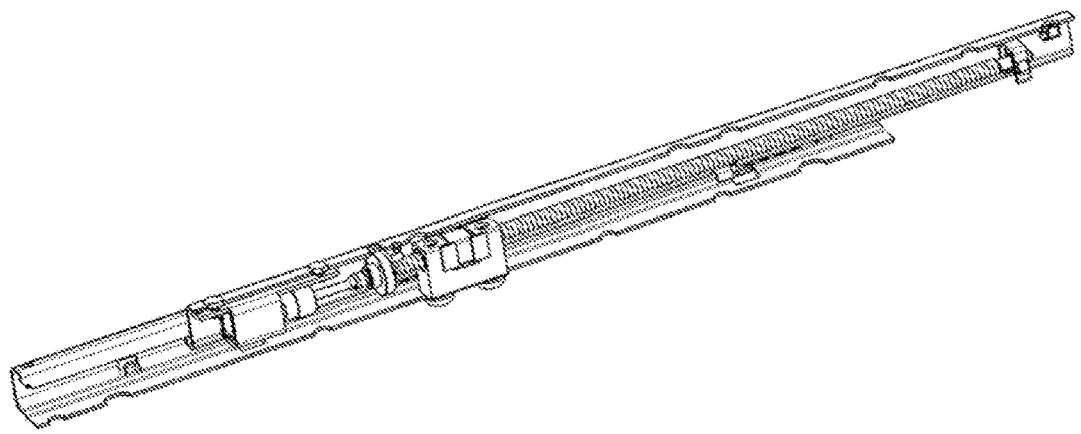
FIG. 8 is a structural diagram of a power slide with a motor directly connected to a lead screw in another embodiment of the invention.
Figure 9:
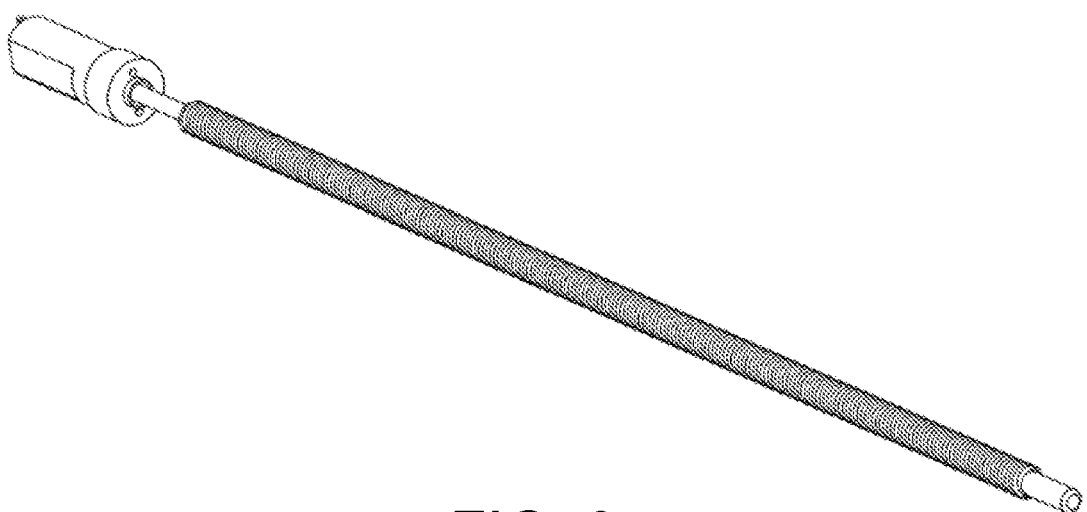
FIG. 9 is a structural diagram of a lead screw and a power motor, which are formed integrally, of the power slide with a motor directly connected to a lead screw according to the invention.

Referring to FIG. 8-FIG. 9, in another embodiment of the invention, the lead screw 16 and a rotor shaft of the power motor 15 are integrally formed. The power motor 15 drives the rotor shaft, namely the lead screw 16, to rotate.

The above description is merely used to explain specific implementations of the invention, and is not intended to limit the protection scope of the invention. Any variations or substitutions that can be made without creative labor should also fall within the protection scope of the invention. Thus, the protection scope of the invention should be subject to the protection scope defined by the claims.

What is claimed is:

1. A power slide with a motor directly connected to a lead screw, the power slide comprising a left slide and a right slide, wherein the left slide and the right slide each comprise:

a top rail and a bottom rail, wherein the top rail is arranged above the bottom rail and is slidably connected to the bottom rail, and a first slot and a second slot are formed in two ends of the top rail, respectively;

a power motor, fixed to a lower surface of the top rail through a motor bracket;

a lead screw, arranged above the bottom rail in parallel and having an end that is connected to the power motor and another end that is rotatably fixed to the lower surface of the top rail;

a threaded assembly, wherein a bottom portion of the threaded assembly is fixedly connected to an upper surface of the bottom rail, and the lead screw horizontally penetrates through the threaded assembly and is in threaded fit with the threaded assembly; and a retainer ring, fixed to the end, close to the power motor, of the lead screw, wherein the retainer ring is located in the first slot, and a gap is formed between the retainer ring and the first slot.

2. The power slide with a motor directly connected to a lead screw according to claim 1, wherein a rubber part is arranged between the power motor and the motor bracket and is disposed around an outer surface of the power motor.

3. The power slide with a motor directly connected to a lead screw according to claim 2, further comprising a rear bracket fixed in the second slot, wherein a central hole is formed in the rear bracket, and an integrally-formed unthreaded shaft is arranged at the another end, rotatably fixed to the lower surface of the top rail, of the lead screw, and is matched with the central hole.

4. The power slide with a motor directly connected to a lead screw according to claim 1, wherein the motor bracket is fixedly connected to the lower surface of the top rail through a first bolt.

5. The power slide with a motor directly connected to a lead screw according to claim 4, wherein the threaded assembly is fixedly connected to the bottom rail through a second bolt.

6. The power slide with a motor directly connected to a lead screw according to claim 1, wherein the lead screw and a rotor shaft of the power motor are integrally formed.

7. The power slide with a motor directly connected to a lead screw according to claim 1, further comprising a rear bracket fixed in the second slot, wherein a central hole is formed in the rear bracket, and an integrally-formed unthreaded shaft is arranged at the another end, rotatably fixed to the lower surface of the top rail, of the lead screw, and is matched with the central hole.

* * * * *